Figure 1:
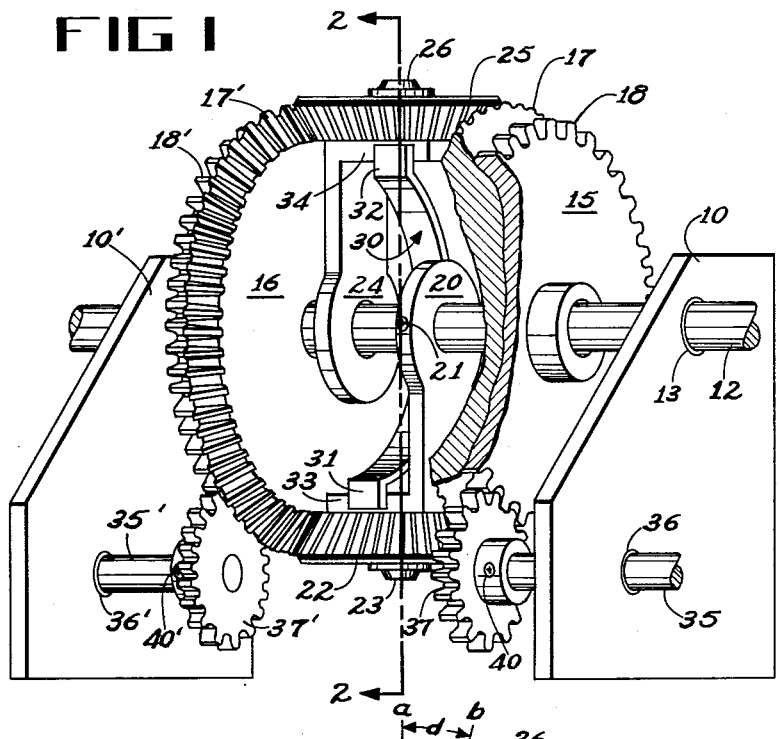

Dec. 12, 1961    G. M. STOCKWELL    3,012,449
ANTIBACKLASH DIFFERENTIAL MECHANISM
Filed April 22, 1959

INVENTOR.
GLADE M. STOCKWELL
BY Marvin Moody
ATTORNEY

United States Patent Office 3,012,449
Patented Dec. 12, 1961

3,012,449
ANTIBACKLASH DIFFERENTIAL MECHANISM
Glade M. Stockwell, Cedar Rapids, Iowa, assignor to Collins Radio Company, Cedar Rapids, Iowa, a corporation of Iowa
Filed Apr. 22, 1959, Ser. No. 808,093
3 Claims. (Cl. 74—713)

This invention relates specifically to a method for removing backlash from a differential mechanism.

The general method for removing backlash from a pair of meshing gears is to replace one of the gears with a spring loaded split gear, for example, as shown in Patent 2,607,238 to R. R. English et al. This method has been successful and economical for common spur gear trains. However, differentials for the most part incorporate bevel gears for both the end gears and pinion gears. To substitute split bevel gears for either the pinion gears or end gears would unduly complicate the differential mechanism. Precision differential mechanisms for instrumentation are small and compact, and would have to be enlarged if spring loaded split bevel gears were used.

Other systems for removing backlash from bevel gear differential mechanisms have provided for shimming the pinion gears or end gears so as to move the gears closer together to form a tighter mesh. As is well known in the art of gearing, the angles formed by the bevels on the end gears and pinion gears must originate at a common center, which in the case of a differential is the geometric center. However, it is obvious that when the above method for removing backlash is incorporated, the origin of the angle formed by the teeth of the adjusted gear will no longer be at the geometric center of the differential. Under this condition gears possess an irregular rotational characteristic which is caused by the gears having a slightly different pitch at their contacting surfaces.

The face gear differential incorporates spur gears for the pinions, and face gears for the end gears. This form of differential unlike the bevel gear differential may be shimmed at the end gears to bring them into tighter mesh with the pinion gears thereby removing the backlash.

However, the construction of the face gears in this type of differential requires gear cutting equipment which is not always available, and the critical placement of the shafts forming the axes for the pinions requires extreme accuracy and needs expensive, precise equipment and is therefore expensive to manufacture.

Another method of removing backlash from differential mechanisms is described in a co-pending application of Harry W. Lehman, Serial No. 698,243, now Patent No. 2,900,846, and assigned to the same assignee, wherein the backlash in a differential is removed by incorporating meshed pairs of spring loaded helical gears. However, the accuracy of this differential is likewise limited because of the difficulty in accurately cutting the helical gears.

Therefore, it is an object of this invention to provide an inexpensive antibacklash differential mechanism.

It is a further object of this invention to provide an antibacklash differential mechanism of the type which has either bevel or spur gears.

It is still another object of this invention to provide a differential mechanism which requires only one precision pinion gear rather than all pinion gears being of precision quality as is required in the present systems.

It is another object of this invention to provide an antibacklash differential which is capable of being both inexpensively and accurately manufactured.

It is a further object of this invention to provide a means for loading the axes of the pinion gears of the differential mechanism such that backlash will be removed.

This invention features a differential mechanism which has the mounting means for a first pinion gear rigidly mounted to a drive shaft and a mounting means for a second pinion gear rotatably mounted on said drive shaft. Spring loading means is applied between the two mounting means such that the rotatable mounting means is deflected sufficiently to cause the pinion gear on the rotatable mounting means to drive the end gears into tight mesh with the pinion on the rigidly mounted mounting means, thereby removing the backlash from all gear meshes in the differential mechanism. The pinion gear on the rigidly mounted mounting means is of a precision quality as required by the accuracy of the differential mechanism. The pinion gear of the rotatably mounted mounting means can be of most any quality as its accuracy is not reflected in the accuracy of the differential mechanism.

Other objects, features, and advantages of the invention will become apparent from the following description and claims when read in view of the accompanying drawings, which show one embodiment of this invention.

Figure 2:
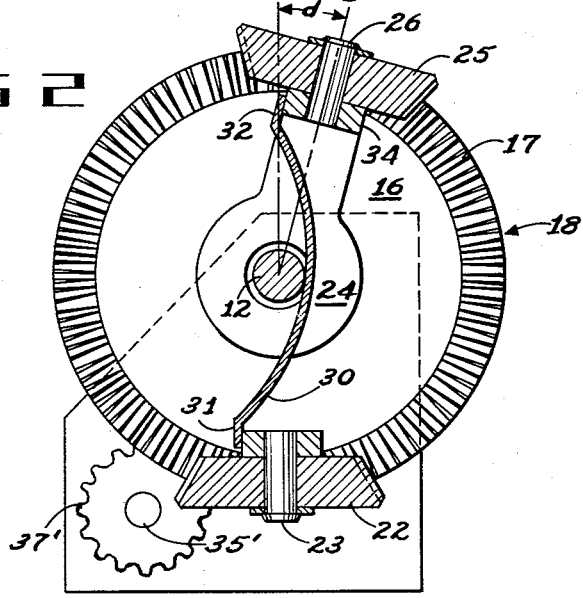

FIGURE 1 shows one end of the invention, and
FIGURE 2 shows a cross view of FIGURE 1.

Referring to FIGURE 1, a method for mounting the differential is represented by a pair of mounting plates 10 and 10', which are used to support the differential mechanism. The plates may be either joined or separate. A shaft 12 is rotatably mounted transversely through said plates on bearings 13 and 13' (not shown). End gears 15 and 16 are rotatably mounted axially on shaft 12. The end gears 15 and 16 are formed by bevel gears 17 and 17' axially mounted to output gears 18 and 18'.

An L-shaped pinion gear mounting means 20 is rigidly attached at one end to shaft 12 by a means such as a set screw or dowel pin 21. A pinion gear 22 is rotatably attached to the end of pinion gear mounting means 20 by a shaft 23, said shaft being rigidly mounted within the end of L-shaped mounting means 20.

A second L-shaped pinion gear mounting means 24 is rotatably mounted on shaft 12 and carries a pinion gear 25 which is rotatably mounted to the end of pinion gear mounting 24 by means of a shaft 26. Shaft 26, like shaft 23, is rigidly mounted to the end of pinion gear mounting means 24. Pinion gears 22 and 25 are substantially oppositely disposed from one another and meshed with bevel gears 17 and 17' of end gear assemblies 15 and 16. While L-shaped mounting means 20 and 24 are depicted, it is obvious to one skilled in the art that any form of mounting within the scope of the invention can be substituted. The loading of pinion 22 by end gears 16 and 15 is accomplished by a C-shaped spring 30 which has its ends 31 and 32 flattened such that they will bear against the edges 33 and 34 respectively of pinion gear mounting means 20 and 24.

A second connection to the differential is provided by a shaft 35 which is rotatably mounted within plate 10 through a bearing 36. At the end of shaft 35 is a spur gear 37 which meshes with output gear 18. A second shaft 35' is rotatably mounted within said plate 10' through a bearing 36'. On the end of shaft 35' is another spur gear 37' which meshes with output gear 18'. Both of the spur gears are rigidly attached to shafts 35 and 35' by set screws or dowels 40 and 40'.

The differential without the antibacklash feature operates in a manner similar to any other standard differential mechanism, that is, inputs may be provided to any two of shafts 12, 35 and 35' and the output will be provided by the remaining shaft.

The antibacklash feature is provided by the unique mounting of pinion gear 25. This mounting comprises an L-shaped member 24 which is rotatably mounted on a shaft 12. A spring 30 provides a force which tends to cause the supporting member 24 to rotate about shaft 12 in the direction of the spring bias.

The antibacklash differential operates as follows: When spring bias is supplied to the rotatable L-shaped mounting member 24 (see FIGURE 2), the axis of shaft 26 of pinion gear 25 will be deflected from its original perpendicular position "a" to a new position "b" causing the mounting member 24 to rotate about shaft 12 a distance d. (The distance is exaggerated in the drawing to better illustrate the movement of mounting member 24. Normally the distance is very slight.) The movement of the pinion gear 25 will cause the teeth of pinion gear 25 to carry both end gears 15 and 16 in the same rotational direction about shaft 12. However, since the mounting means for pinion gear 22 is rigidly attached to shaft 12 by set screw or dowel 21, pinion gear 22 is not free to rotate about shaft 12. Therefore, as end gears 15 and 16 rotate in the same direction, the slack between the gear teeth of both end gear 15 and end gear 16 which engage pinion gear 22, will be removed.

A C-shaped spring member is disclosed which causes the L-shaped mounting member 24 to be deflected slightly thus removing the backlash. However, it is obvious that any form of spring, either torsion, compression or extension operating upon mounting members 20 and 24, which would be designed to cooperate with the particular spring selected, could be substituted in place of the C-shaped spring.

A further feature of this invention is the fact that only one of the pinion gears need be accurate, namely pinion gear 22. This is apparent upon inspection of the operation of the device. Since pinion gear 25 is spring biased by spring 30, it possesses a certain amount of movement about shaft 12. Therefore, any inaccuracy in the forming of the teeth will cause the pinion gear 25 to move slightly relocating its axis. This movement will decrease or increase slightly the force against the teeth of pinion 22 but will not interfere or change its angular displacement. Backlash between gears 37 and 18 and 37' and 18' can be removed by the conventional split gear method, substituting a split gear for the spur gear 37. Gears 37 and 37' are external to the differential and are shown only for added clarity.

It should be further noted that errors in meshing between the teeth of the pinion gear and the end gears 15 and 16 caused by a mislocation of the centering of the pinion gear is not present in this system since the pinion gear 25 always maintains the same distance from the geometric center of the differential.

This invention has been described with respect to a bevel gear type differential. However, it is obvious that the invention will apply equally to a face gear type differential since the principle of operation of both is exactly the same, the only difference being in the method of cutting the gears.

Although this invention has been described with respect to a particular embodiment thereof, it is not to be so limited, as changes and modifications may be made therein which are within the full intended scope of the invention as defined by the appended claims.

I claim:

1. An antibacklash differential mechanism comprising a shaft rotatably mounted, first and second end gears rotatably mounted on said shaft, a first mounting means nonrotatably mounted on said shaft, and a first pinion gear rotatably mounted on said first mounting means and cooperatively engaging said first and second end gears, a second mounting means rotatably mounted on said shaft between said end gears, a second pinion rotatably mounted on said second mounting means and cooperatively engaging said first and second end gears, and a biasing means acting between said first and second mounting means for applying torque to each of said mounting means in opposite directions, said biasing means urging said second pinion gear mounting means to rotate about said shaft whereby said second pinion gear urges said first and second end gears to rotate in the same direction thereby loading the teeth of said first pinion gear and causing said backlash between said pinion and said end gears to be removed.

2. An antibacklash differential comprising, a shaft rotatably mounted, first and second end gears rotatably mounted on said shaft, a first L-shaped mounting means nonrotatably mounted on said shaft, a first pinion gear rotatably mounted on said first L-shaped mounting means and engaging both said end gears, a second L-shaped mounting means rotatably mounted on said shaft, a second pinion gear rotatably mounted on said second L-shaped mounting means and engaging both said end gears, a biasing means acting between said first and second L-shaped mounting means for applying torque to each of said mounting means in opposite directions, said biasing means urging said second pinion gear mounting means to rotate about said shaft whereby said second pinion gear urges said first and second end gears to rotate in the same direction thereby loading the teeth of said first pinion gear and causing said backlash between said pinion and said end gears to be removed.

3. An antibacklash differential mechanism as described in claim 2 wherein said biasing means includes a C-shaped spring, said C-shaped spring engaging said first and said second mounting means and said shaft, said spring being designed to apply torque to each of said mounting means in opposite directions so as to cause said second rotatably mounted L-shaped mounting means to rotate slightly about said shaft.

References Cited in the file of this patent

UNITED STATES PATENTS 2,924,998    Sem et al. _____ Feb. 16, 1960